US009573465B2

(12) United States Patent
Nishida et al.

(10) Patent No.: US 9,573,465 B2
(45) Date of Patent: Feb. 21, 2017

(54) VEHICLE TRANSMISSION

(71) Applicant: HONDA MOTOR CO., LTD., Tokyo (JP)

(72) Inventors: Tomohiro Nishida, Wako (JP); Tadashi Oshima, Wako (JP); Nobutaka Ban, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/215,402

(22) Filed: Mar. 17, 2014

(65) Prior Publication Data

US 2014/0296018 A1    Oct. 2, 2014

(30) Foreign Application Priority Data

Mar. 28, 2013    (JP) .................................. 2013-068155

(51) Int. Cl.
| | |
|---|---|
| *B60K 20/06* | (2006.01) |
| *B60K 20/02* | (2006.01) |
| *B60K 23/02* | (2006.01) |
| *B60K 23/04* | (2006.01) |

(52) U.S. Cl.
CPC .............. *B60K 20/02* (2013.01); *B60K 23/02* (2013.01); *B60K 23/04* (2013.01); *B60K 2023/046* (2013.01)

(58) Field of Classification Search
CPC .............................................. B60K 2023/046
See application file for complete search history.

(56) References Cited

U.S. PATENT DOCUMENTS

| | | | | |
|---|---|---|---|---|
| 2,045,516 | A * | 6/1936 | Brewer ....................... | 192/3.59 |
| 6,000,296 | A * | 12/1999 | Sundquist ............. | B60K 20/04 |
| | | | | 180/233 |
| 7,322,457 | B2 * | 1/2008 | Giefer et al. ............. | 192/219.4 |
| 8,540,605 | B2 * | 9/2013 | Marur ............................ | 477/99 |
| 9,346,352 | B2 * | 5/2016 | Karube ................. | B60K 17/20 |
| 2002/0148319 | A1 * | 10/2002 | Miguchi ................. | F16H 59/02 |
| | | | | 74/473.34 |
| 2007/0068328 | A1 * | 3/2007 | Suzuki ............................ | 74/523 |
| 2007/0235242 | A1 * | 10/2007 | Nozaki et al. ................ | 180/247 |

(Continued)

FOREIGN PATENT DOCUMENTS

JP       2007-062607       3/2007

*Primary Examiner* — Justin Holmes
*Assistant Examiner* — Lillian Nguyen
(74) *Attorney, Agent, or Firm* — Rankin, Hill & Clark LLP

(57) ABSTRACT

A transmission includes a drive force transmission/interruption mechanism that restricts the rotation of a propeller shaft. By operating a shift lever, the shift operation of the transmission and the operation of the drive force transmission/interruption mechanism can be performed, and a lock operation and an unlock operation of a differential lock mechanism can be performed. When a driver wants to bring a vehicle into a parking state, by operating a shift lever, a state is provided where a drive force transmission/interruption mechanism is locked so that the rotation of a propeller shaft is restricted, and the vehicle can be held in a stopped state by bringing a differential lock mechanism into a locked state. Since the vehicle can be brought into a parking state using the shift lever, a so-called parking lever becomes unnecessary so that the number of operation elements can be reduced.

4 Claims, 13 Drawing Sheets

(56) References Cited

U.S. PATENT DOCUMENTS

2012/0067155 A1* 3/2012 Grosse Kohorst .. F16H 59/0204
  74/473.15
2015/0096822 A1* 4/2015 Sato ....................... B60K 23/04
  180/250

* cited by examiner

VEHICLE TRANSMISSION

BACKGROUND OF THE INVENTION

Field of the Invention

The present invention relates to a vehicle provided with a shift lever mechanism, and particularly to an improved shift lever mechanism.

Description of Related Art

There has been known a vehicle provided with a shift lever for changing over a traveling mode (for example, see JP-A-2007-62607 (FIG. 3))

In FIG. 3 of JP-A-2007-62607, an operation lever device (100) is disclosed (numerals with a parenthesis indicating symbols described in JP-A-2007-62607, the same being applied for the explanation made hereinafter). The operation lever device (100) includes an operation mode switching lever (102) and a shift lever (103).

Switching between 2-wheel driving and 4-wheel driving and lock-free switching of a differential-lock mechanism are performed by the operation mode switching lever (102). Switching between high-speed frontward traveling, low-speed frontward traveling and backward traveling is performed by the shift lever (103).

Although not described in JP-A-2007-62607, a parking lever or a parking pedal, which is operated in a parking state, is additionally provided to the vehicle.

Assuming that the parking lever is provided to the vehicle, it is necessary for a driver to operate three operation elements consisting of the parking lever, the operation mode switching lever (102) and the shift lever (103) and hence, the operation becomes cumbersome. Further, three levers are necessary and hence, the number of parts is increased whereby a space for mounting the parts becomes necessary.

There is a demand for reducing the number of operation elements to reduce the number of parts and required mounting space.

SUMMARY OF THE INVENTION

It is an object of the invention to provide a vehicle provided with a shift lever mechanism with which the number of operation elements can be reduced.

The present invention is directed toward a vehicle including a transmission that is capable of changing a change gear ratio at which power is transmitted to a drive wheel from a power unit; a propeller shaft that is connected to the transmission and transmits power to the drive wheel; a differential mechanism that generates a difference in rotational speed between the left and right wheels; a differential lock mechanism that is configured to bring the differential mechanism into a non-differential state; a shift lever that is supported on a vehicle body frame and changes the change gear ratio of the transmission; and a shift lever panel on which a plurality of gates into which the shift lever is inserted are formed. The transmission includes a drive force transmission/interruption mechanism that restricts the rotation of the propeller shaft. The shift lever is mechanically connected to the transmission and is also mechanically connected to the differential lock mechanism. The vehicle includes a shift lever mechanism that is configured to perform a shift operation of the transmission and an operation of the drive force transmission/interruption mechanism and is configured to perform a lock operation and an unlock operation of the differential lock mechanism by operating the shift lever.

Therefore, by operating only one shift lever, the shift operation of the transmission can be performed, and the operation of the drive force transmission/interruption mechanism that restricts the rotation of the propeller shaft and the lock operation of the differential lock mechanism can be also performed.

Accordingly, when a driver wants to bring the vehicle into a parking state, by operating the shift lever, a state is provided where the drive force transmission/interruption mechanism is locked so that the rotation of the propeller shaft is restricted, and the vehicle can be held in a stopped state by bringing the differential lock mechanism into a locked state. Since the vehicle can be brought into a parking state using the shift lever, a so-called parking lever becomes unnecessary so that the number of operation elements can be reduced.

In further accordance with the present invention, the shift lever mechanism includes a first rotation axis about which the shift lever is rotated, and a second rotation axis that is arranged orthogonal to and close to the first rotation axis and about which the shift lever is rotated. The shift lever is rotated about the first rotation axis in operating the transmission, and is rotated about the second rotation axis in operating the differential lock mechanism. Hence, the direction of the operation for rotating the shift lever about the first rotation axis and the direction of the operation for rotating the shift lever about the second rotation axis completely differ from each other so that one operation hardly influences the other operation.

In further accordance with the present invention, an L-shaped hole having a corner at a front end thereof is formed in the shift lever panel, and the shift lever operates the transmission due to operation thereof in the fore-and-aft direction, and operates the differential lock mechanism due to operation thereof in the left-and-right direction. The differential lock mechanism is operated only at the time of parking, and frequency of the transmission being operated is higher than that of the differential lock mechanism and hence, operation in the fore-and-aft direction, which can be easily performed, is set as the operation of the transmission.

In further accordance with the present invention, the L-shaped hole is formed such that the L-shaped hole extends in the direction toward a side where a driver is seated from the corner at the front end thereof.

The driver lowers the shift lever toward the inside and hence, the shift lever can be easily operated from a viewpoint of human engineering.

BRIEF DESCRIPTION OF THE DRAWINGS

These and further features of the invention will be apparent with reference to the following description and drawings, wherein.

DETAILED DESCRIPTION OF THE INVENTION

Hereinafter, an embodiment of the invention is explained in conjunction with attached drawings. The drawings are viewed in the direction of symbols.

Figure 1:
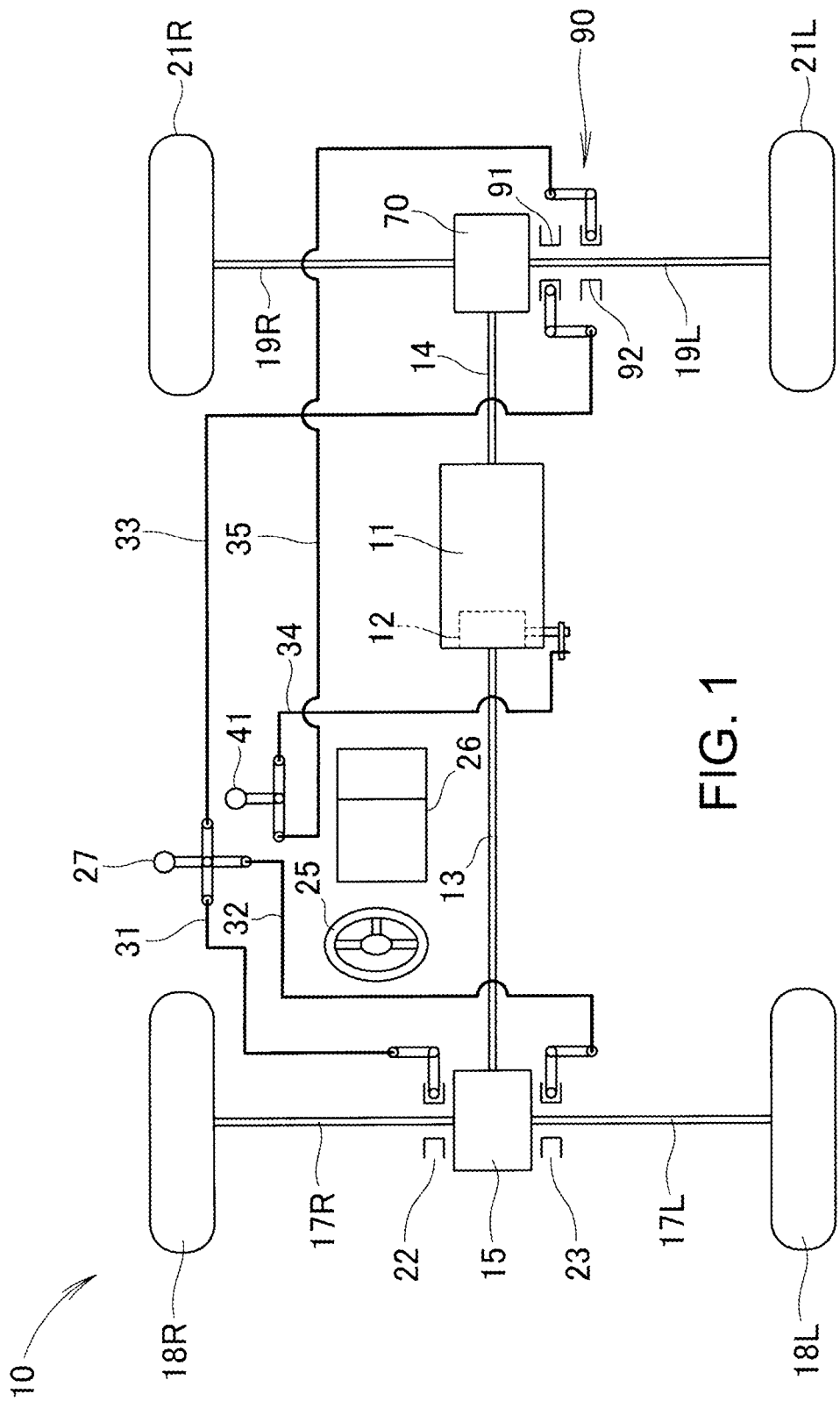
FIG. 1 is a plan view (schematic view) showing a drive system of a vehicle.

As shown in FIG. 1, a vehicle 10 includes: a power unit 11, a transmission 12 represented by a gear transmission for changing a change gear ratio at which power is transmitted from the power unit 11; a front propeller shaft 13 and a rear propeller shaft 14 that extend in the longitudinal direction from the transmission 12 for transmitting power; a front differential gear 15 that distributes power transmitted by the front propeller shaft 13 to left and right sides and a rear differential gear 70 that distributes power transmitted by the rear propeller shaft 14 to left and right sides; and front drive wheels 18L, 18R that are driven by the front differential gear 15 by drive shafts 17L, 17R, respectively, (symbol L being a subscript indicating a left side with respect to a driver, and symbol R being a subscript indicating a right side with respect to the driver, the same goes for the explanation made hereinafter) and rear drive wheels 21L, 21R that are driven by the rear differential gear 70 by drive shafts 19L, 19R, respectively.

The vehicle 10 may preferably be an off-road traveling vehicle that can travel not only on a flat road surface but also on an off-road surface such as a field. Accordingly, the front differential gear 15 includes a front differential lock mechanism 22 and a two-wheel/four-wheel drive switching mechanism 23.

In addition, the vehicle 10 includes, in the rear differential gear 70, a differential mechanism restricting device 90 as a differential lock mechanism for bringing a differential mechanism (symbol 74 in FIG. 8) into a non-operable state. The differential mechanism restricting device 90 includes a first slide member 91 and a second slide member 92 that are arranged in parallel with each other, that is, in a juxtaposed manner.

The vehicle 10 further includes a steering handle 25 and a driver's seat 26 on which a driver is seated. The vehicle 10 also includes a first operation element 27 and a second operation element 41 on a right side of the driver's seat 26 in the vehicle width direction. Naturally, in a so-called left-side steering wheel car, the first operation element 27 and the second operation element 41 are arranged on a left side of the driver.

In this embodiment, the first operation element 27 is a switch lever for changing a drive mode. The first operation element 27 is connected to the front differential lock mechanism 22 by a first wire 31, is connected to the two-wheel/four-wheel drive switching mechanism 23 by a second wire 32, and is connected to the first slide member 91 by a third wire 33.

In this embodiment, the second operation element 41 is a switch lever for changing a traveling mode (including a parking mode). That is, the second operation element 41 is a shift lever. The second operation element 41 is connected to the transmission 12 by a fourth wire 34, and is connected to the second slide member 92 by a fifth wire 35. Hereinafter, the second operation element 41 is described as a shift lever 41.

Figure 2:
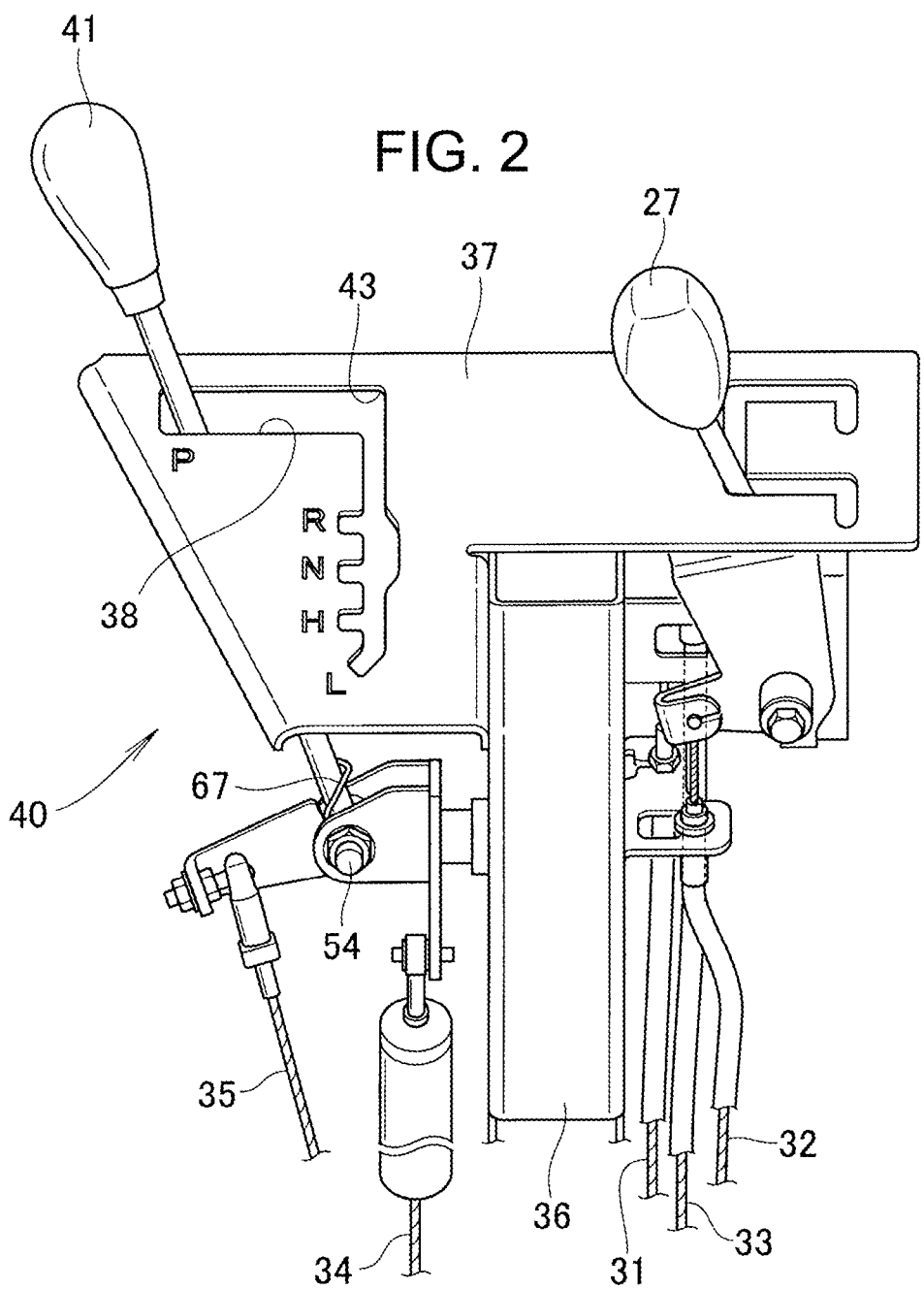
FIG. 2 is a perspective view of a shift lever panel.

As shown in FIG. 2, a shift lever panel 37 is mounted on a vehicle body frame 36 (a bracket and a column attached to the vehicle body frame also constituting parts of the vehicle body frame). An L-shaped hole 38 is formed in the shift lever panel 37, and the shift lever 41 is inserted into the hole 38. In this embodiment, the first operation element 27 is inserted into a right side of the shift lever panel 37.

Although the detailed explanation is omitted, one end of the first wire 31, one end of the second wire 32 and one end of the third wire 33 are connected to the first operation element 27. The first wire 31, the second wire 32 and the third wire 33 are operated by rotating and moving the first operation element 27.

The first operation element 27 for changing over a drive mode is arranged on a right side, and the second operation element (shift lever 41) for changing over a traveling mode (including a parking mode) is arranged on a left side. That is, two operation elements 27, 41 that differ from each other in usage are operated without interfering with each other, and a differential lock operation is performed as a part of such an operation.

Figure 3:
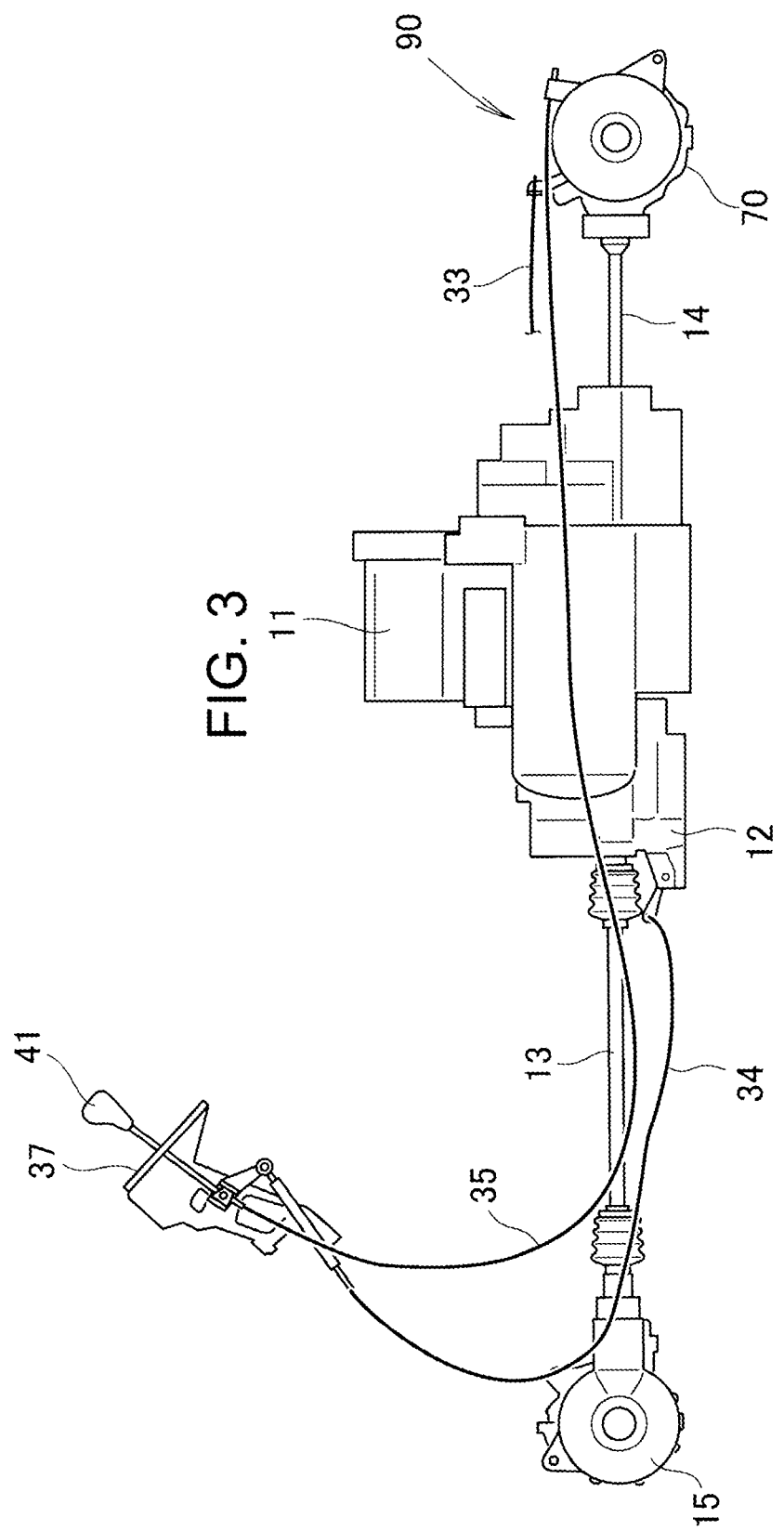
FIG. 3 is a side view showing the drive system and a shift lever of the vehicle.

As shown in FIG. 3, one of the fourth wire 34 and one end of the fifth wire 35 are connected to the shift lever 41 that constitutes the second operation element, the other end of the fourth wire 34 is connected to the transmission 12, and the other end of the fifth wire 35 is connected to the differential mechanism restricting device 90.

Figure 4:
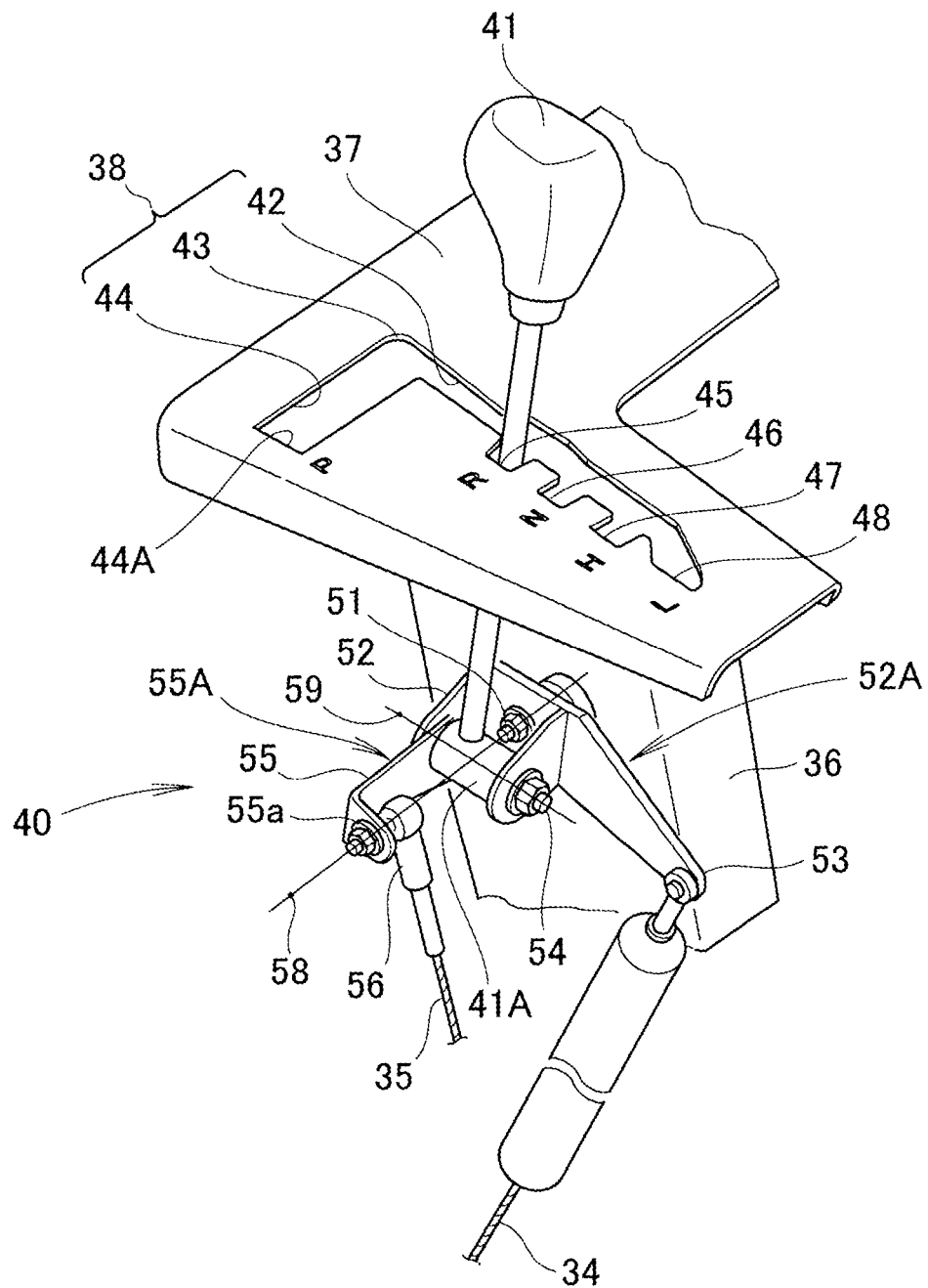
FIG. 4 is a perspective view of a shift lever mechanism.

As shown in FIG. 4, a shift lever mechanism 40 includes the shift lever panel 37, which is mounted on the vehicle body frame 36, the shift lever 41, which is inserted into the L-shaped hole 38 formed in the shift lever panel 37, and various parts attached to the shift lever 41. The L-shaped hole 38 and various parts are explained in detail hereinafter.

The L-shaped hole 38 is formed of a guide groove 42 that extends in the longitudinal direction of the vehicle and a parking gate 44 that extends in an elongated manner in the vehicle width direction from a corner 43 at a front end toward a driver's side. A low-speed frontward traveling gate 45, a high-speed frontward traveling gate 46, a neutral gate 47 and a backward traveling gate 48 are formed in the guide groove 42. The driver can set the shift lever 41 at one of the low-speed frontward traveling gate 45, the high-speed frontward traveling gate 46, the neutral gate 47, the backward traveling gate 48 and the parking gate 44. Such a lever setting operation is referred to as the shifting operation.

A first rotary member 52A is rotatably supported on the vehicle body frame 36 by a first support pin 51, and a U-shaped portion 52 and a first lever portion 53 are formed on the first rotary member 52A. The U-shaped portion 52 of the first rotary member 52A is mounted on the vehicle body frame 36 by the first support pin 51, and one end of the fourth wire 34 is connected to the first lever portion 53, which extends toward a rear side in the longitudinal direction of the vehicle from the U-shaped portion 52.

A proximal portion 41A of the shift lever 41 is mounted on the U-shaped portion 52 by a second support pin 54 that extends in the direction orthogonal to the first support pin 51. A second lever 55 (second rotary member 55A) extends from the proximal portion in the vehicle width direction and toward a driver's side. A distal end 55a of the second lever 55 is bent toward a rear side in the longitudinal direction of the vehicle, and one end of the fifth wire 35 is connected to the distal end 55a by a ball plunger 56.

In the above-mentioned construction, it is important that a first rotation axis 58, which also functions as a center axis of the first support pin 51, passes in the vicinity of the center of a ball (symbol 56b in FIG. 6) of the ball plunger 56. Further, a second rotation axis 59, which also functions as a center axis of the second support pin 54, is arranged orthogonal to and in the vicinity of the first rotation axis 58.

Preferably, the first rotation axis 58, which also functions as the center axis of the first support pin 51, passes the center of the ball (symbol 56b in FIG. 6) of the ball plunger 56 and the second rotation axis 59, which also functions as the center axis of the second support pin 54, intersects the first rotation axis 58 at a right angle.

When the shift lever 41 is positioned in the guide groove 42 and is rotatable about the first rotation axis 58. As a result, the fourth wire 34 is pulled so that the transmission (symbol 12 in FIG. 1) performs the changeover corresponding to a traveling mode. When the shift lever 41 reaches the corner 43, the shift lever 41 reaches the entrance of the parking gate 44.

Figure 5:
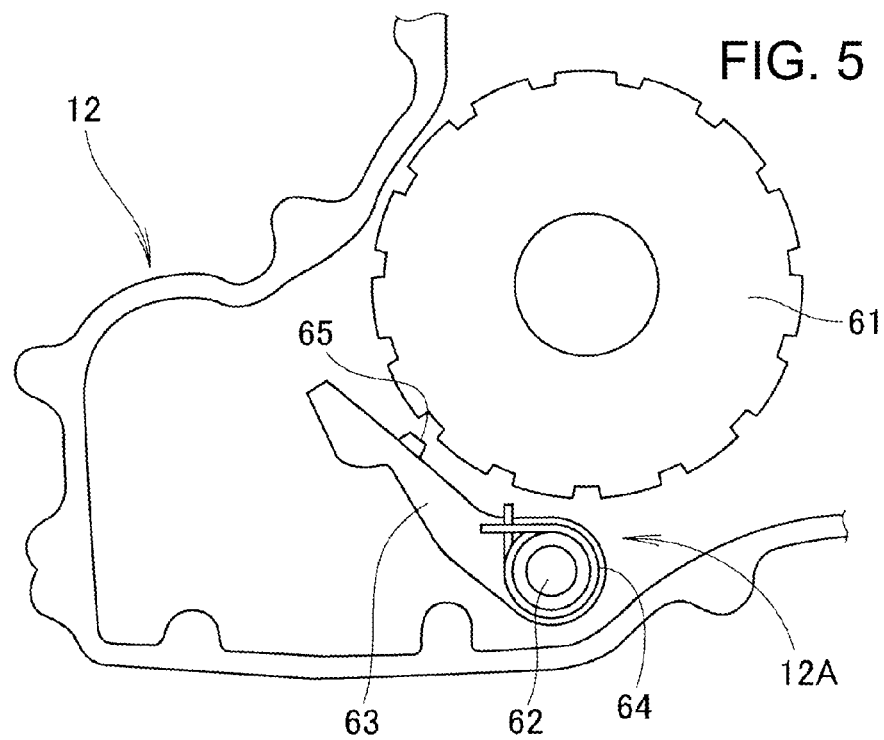
FIG. 5 is a view of an essential part of a transmission.

FIG. 5 is a view showing a part of the transmission, and the transmission 12 includes a drive force transmission interruption mechanism 12A that restricts the rotation of the propeller shaft 14. When the drive force transmission interruption mechanism 12A restricts the rotation of the propeller shaft 14, the rotations of the drive shafts 17L, 17R are also restricted so that the rotations of the rear drive wheels 21L, 21R are restricted.

The drive force transmission interruption mechanism 12A includes: a parking gear 61; a parking pawl shaft 62 that is rotated by the fourth wire 34; a parking pawl 63 that is rotated by the parking pawl shaft 62; and a return spring 64 that biases the parking pawl 63 toward a non-parking side. When the shift lever 41 reaches the entrance of the parking gate 44 in FIG. 4, the parking pawl 63 is rotated against the return spring 64 shown in FIG. 5, and a pawl 65 meshes with the parking gear 61.

Due to such an operation, a first parking state can be acquired. In the parking state, the rotation of the propeller shaft 14, which is connected to the transmission 12, is restricted and brought into a locked state.

As shown in FIG. 2, a torsion spring 67 is mounted around the second support pin 54, and the shift lever 41 is biased in the direction away from the corner 43 by the torsion spring 67. That is, due to a biasing action of the torsion spring 67, the shift lever 41 is pushed to a depth side of any one of the low-speed frontward traveling gate 45, the high-speed frontward traveling gate 46, the neutral gate 47, the backward traveling gate 48, and the parking gate 44.

Next, the manner of operation of the parking gate 44 is explained.

Figure 6:
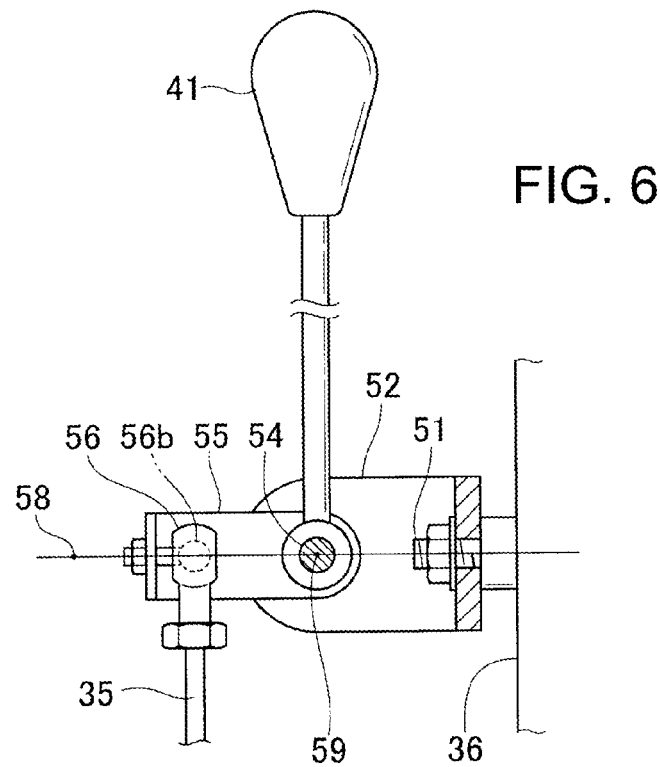
FIG. 6 is a view showing the manner of operation of the shift lever.

FIG. 6 is a view showing a state where the shift lever 41 is at the corner (symbol 43 in FIG. 4). The shift lever 41 is rotated toward the center of a vehicle body about the second rotation axis 59 from such a state.

Figure 7:
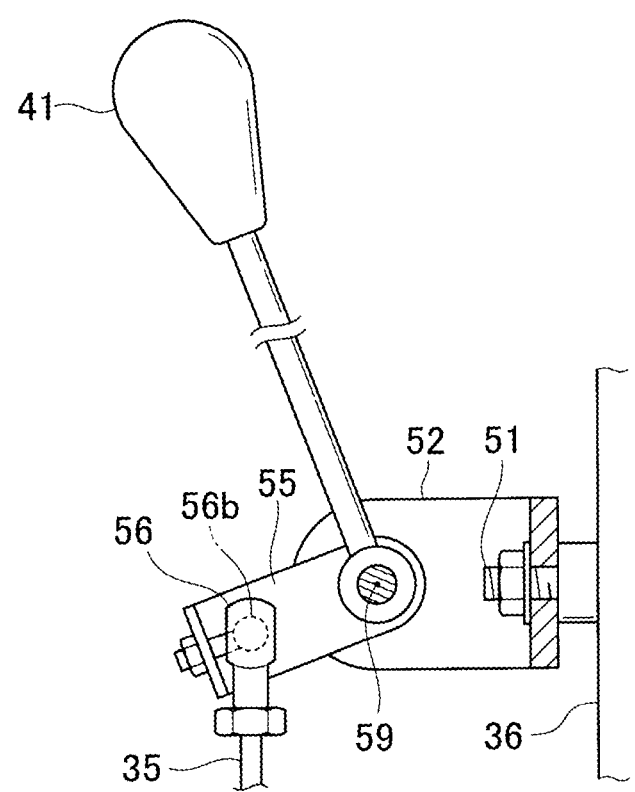
FIG. 7 is a view showing the manner of operation of the shift lever.

FIG. 7 shows the shift lever 41 after the shift lever 41 is rotated. The fifth wire 35 is pushed downward so that a second parking state can be acquired. The second parking state will be described in detail later.

In FIG. 6, by rotating the shift lever 41 in the direction passing through the paper which the drawing is on (longitudinal direction of the vehicle), one of the traveling modes consisting of a low-speed traveling mode, a high-speed traveling mode, a neutral mode, a backward traveling mode and the first parking state is selected. In performing such a mode selection operation, only the U-shaped portion 52 is rotated about the first rotation axis 58, and the ball 56b of the ball plunger 56 is always on the first rotation axis 58. As a result, the second lever 55 is not rotated so that the fifth wire 35 is neither pushed nor pulled.

On the other hand, when the second lever 55 is rotated about the second rotation axis 59 in FIG. 7, the U-shaped portion 52 is held in a stopped state and, hence, the rotation does not influence a traveling mode.

To summarize the movements of the respective parts in the operation of the shift lever 41 for bringing the vehicle into a parking state, firstly, when the shift lever 41 is operated to the corner 43 along the guide groove 42, the first rotary member 52A is rotated so that the fourth wire 34 is pulled. Accordingly, the parking pawl 63 of the drive force transmission interruption mechanism 12A is rotated so that the pawl 65 meshes with the parking gear 61 whereby the transmission of power is brought into an interruption state.

When the shift lever 41 is further operated toward a parking gate 44 side on a left side, the second lever 55 (second rotary member 55A) is rotated so that the fifth wire 35 is pulled and a second arm 115 is rotated. The second slide member 92 is operated by this rotation so that the differential lock mechanism 90 is brought into a locked state.

Accordingly, by operating the shift lever 41 to an end portion 44A of the parking gate 44, it is possible to bring the drive force transmission interruption mechanism 12A into an ON state (interruption state), and it is also possible to bring the differential lock mechanism 90 into a locked state.

As has been described heretofore, the transmission 12 and the differential mechanism restricting device 90 shown in FIG. 3 can be operated using one shift lever 41. Next, the rear differential gear 70 on which the differential mechanism restricting device 90 is mounted is explained in detail.

Figure 8:
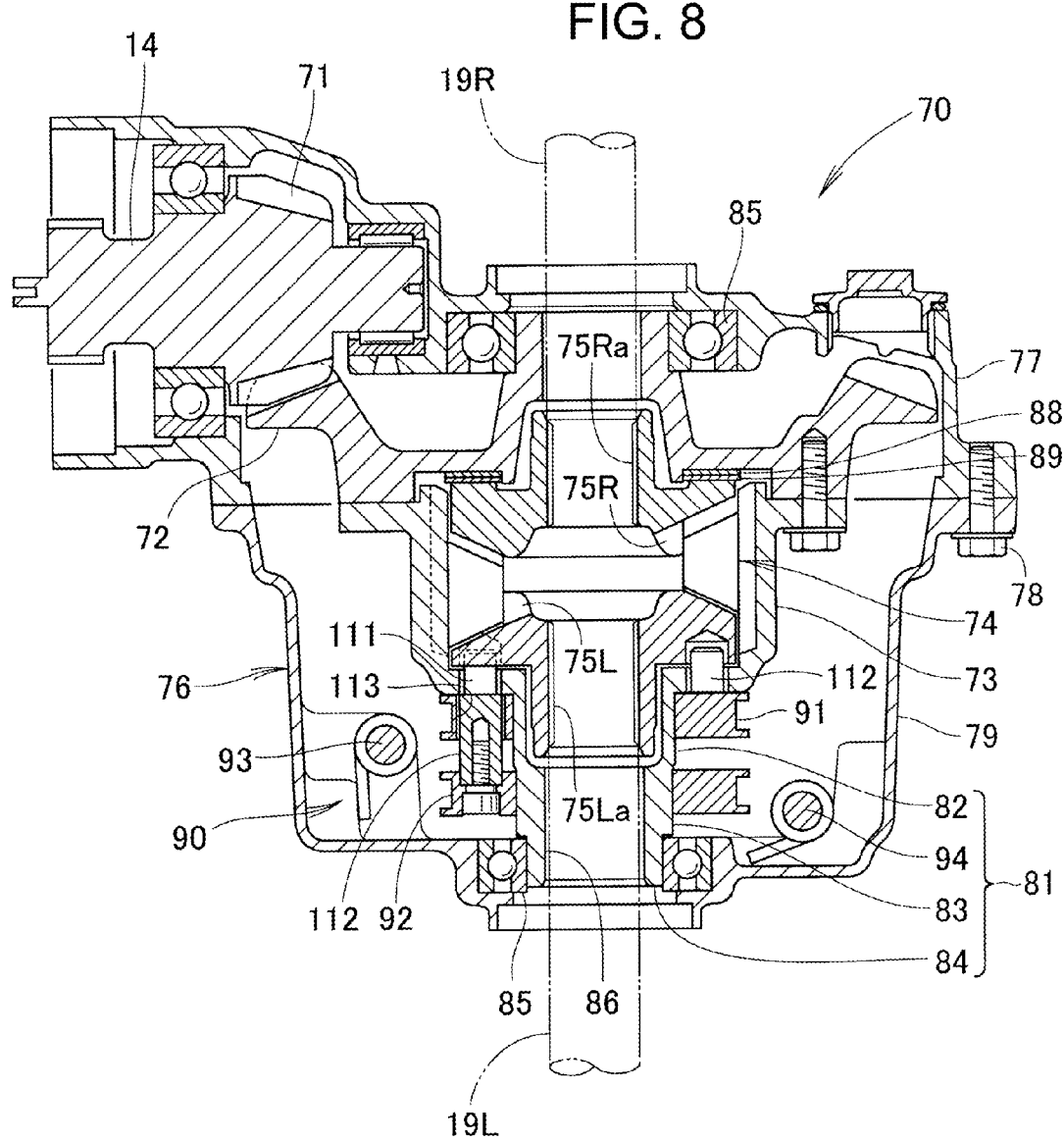
FIG. 8 is a cross-sectional view of a differential gear.

As shown in FIG. 8, the rear differential gear 70 includes: a pinion gear 71 that is mounted on an end portion of the rear propeller shaft 14; a ring gear 72 that meshes with the pinion gear 71; a differential case 73 that is rotated together with the ring gear 72 and forms a differential chamber therein; a differential mechanism 74 that is housed in the differential case 73 and can generate the difference in rotational speed between the left and right wheels; left and right output-side cams 75L, 75R that constitute portions of the differential mechanism 74 and transmit power transmitted to the ring gear 72 to the drive shafts (19L, 19R in FIG. 1); and a gear case 76 that houses the ring gear 72 and the differential case 73.

A washer 88 and a disc spring 89 are interposed between the ring gear 72 and the right output-side cam 75R so that the right output-side cam 75R is biased toward a left output-side cam 75L side.

A spline groove 75La is formed on the left output-side cam 75L, and one end of the drive shaft 19L is fitted in the spline groove 75La. In the same manner, a spline groove 75Ra is formed on the right output-side cam 75R, and one end of the drive shaft 19R is fitted in the spline groove 75Ra.

The gear case 76 is constituted of a first case half body 77 that rotatably supports the pinion gear 71, and a second case half body 79 that is connected to the first case half body 77 by bolts 78. The differential mechanism restricting device 90 is housed in the second case half body 79.

A cylindrical shaft 81 is formed on a portion of the differential case 73 on a side opposite to the ring gear 72. The cylindrical shaft 81 has a large diameter portion 82, an intermediate diameter portion 83 and a small diameter portion 84 such that a diameter of the cylindrical shaft 81 is gradually decreased in the direction toward a distal end side. The small diameter portion 84 is supported on the gear case 76 by way of a bearing 85.

The first slide member 91, which constitutes one of the constitutional elements of the differential mechanism restricting device 90, is fitted on the large diameter portion 82 in an axially movable manner, and the second slide member 92, which constitutes a constitutional element of the differential mechanism restricting device 90, is fitted on the intermediate diameter portion 83 in an axially movable manner.

Figure 9:
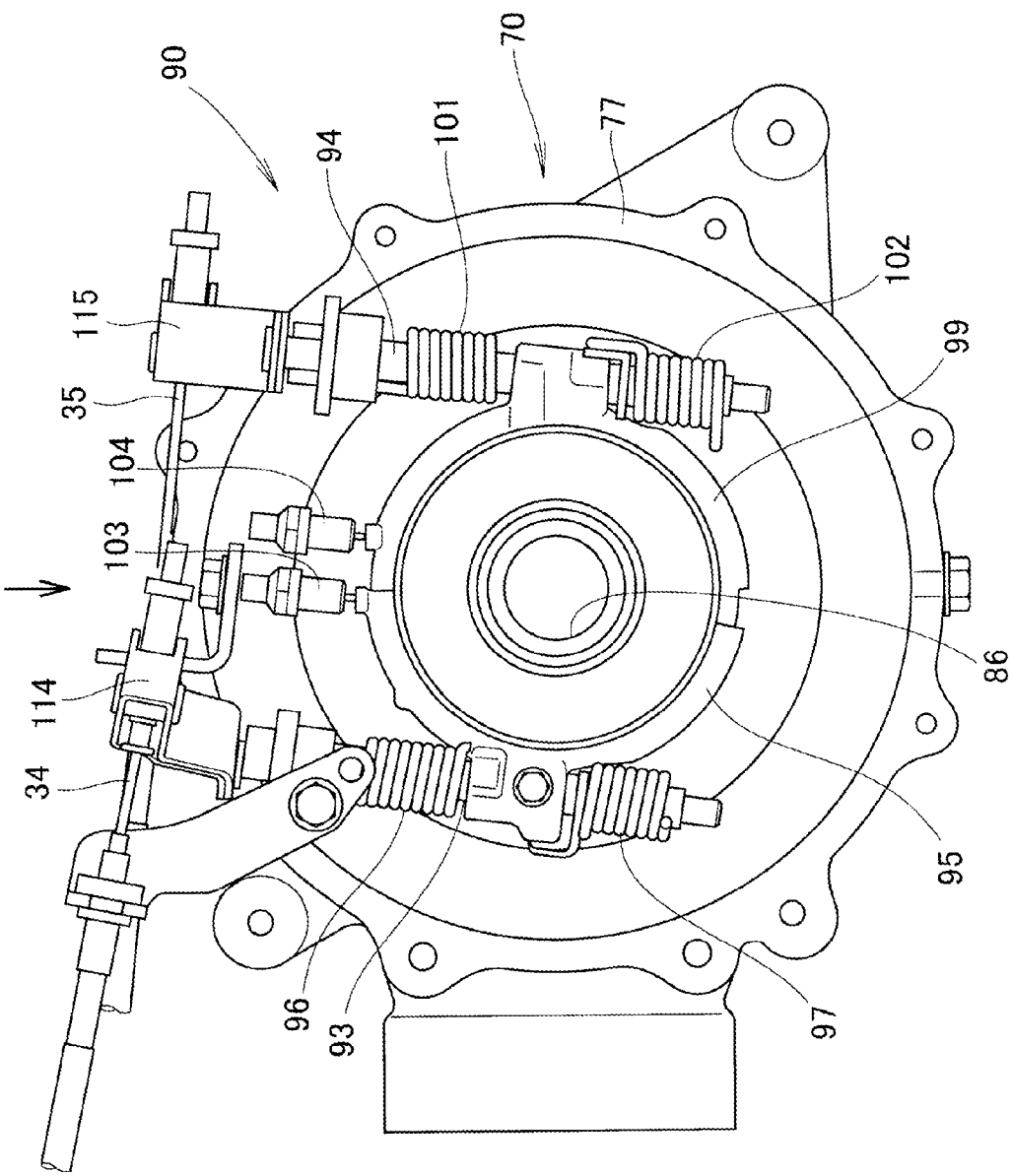
FIG. 9 is a side view of the differential gear.

FIG. 9 shows a state where the differential mechanism restricting device 90 is exposed by removing the second case half body 79 from the first case half body 77.

As shown in FIG. 9, a first rotary shaft 93, which is an element of the differential mechanism restricting device 90, is arranged vertically on a front side in the longitudinal direction of the vehicle and a second rotary shaft 94, which is an element of the differential mechanism restricting device 90, is arranged vertically on a rear side in the longitudinal direction of the vehicle with an axle hole 86 into which the drive shaft (symbol 19L in FIG. 1) can be fitted sandwiched therebetween.

That is, by arranging the first rotary shaft 93 and the second rotary shaft 94 in a separated manner in the longitudinal direction of the vehicle, it is possible to easily avoid interference between the members (to be more specific, a first arm 114 and a second arm 115) for rotating the rotary shafts 93, 94, and it is also possible to suppress the large-sizing of the differential mechanism restricting device 90 in the vehicle width direction.

The fourth wire 34 is connected to the first arm 114 mounted on an upper end of the first rotary shaft 93, and a half-ring-shaped first shift fork 95 is mounted on an intermediate portion of the first rotary shaft 93. Further, an upper torsion spring 96 and a lower torsion spring 97 are wound around the first rotary shaft 93.

In the same manner, the fifth wire 35 is connected to the second arm 115 mounted on an upper end of the second rotary shaft 94, and a half-ring-shaped second shift fork 99 is mounted on an intermediate portion of the second rotary shaft 94. Further, an upper torsion spring 101 and a lower torsion spring 102 are wound around the second rotary shaft 93.

A fork detection sensor 103 is arranged above the first shift fork 95, and it is possible to confirm that the first shift fork 95 is at a predetermined position by the fork detection sensor 103. In the same manner, a fork detection sensor 104 is arranged above the second shift fork 99, and it is possible to confirm that the second shift fork 99 is at a predetermined position by the fork detection sensor 104.

Although the predetermined position is a differential lock position or a differential unlocked position, it is preferable to set the differential unlocked position that is used frequently as the predetermined position.

Figure 10:
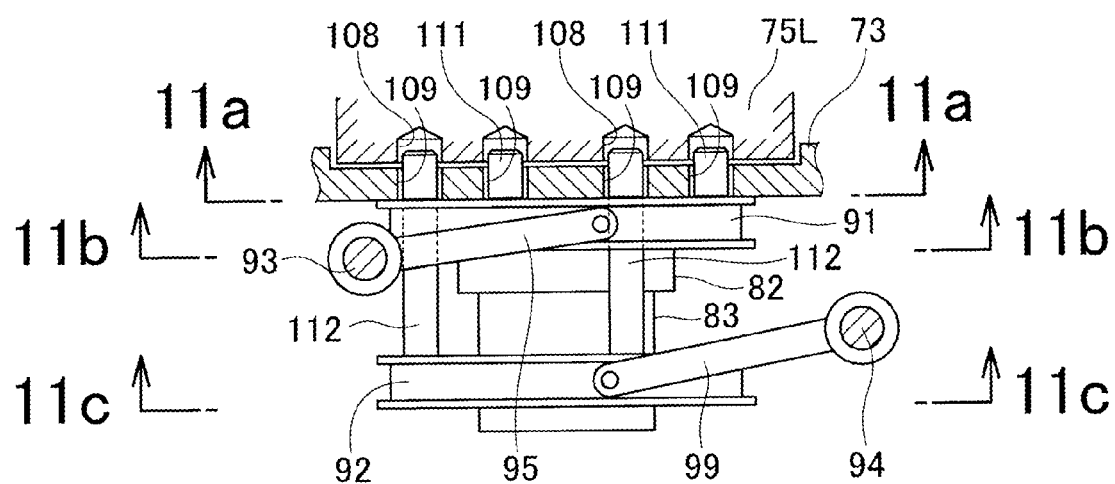
FIG. 10 is a view as viewed in the direction indicated by an arrow 10 in FIG. 9.

As shown in FIG. 10, a plurality of holes 108 are formed in the left output-side cam 75L, and pin holes 109 are formed in the differential case 73 in a penetrating manner such that the pin holes 109 overlap with the holes 108 respectively.

A plurality of first pins 111, which pass through the pin holes 109 in a penetrating manner and are fitted in the holes 108, extend from the first slide member 91. A plurality of second pins 112, which pass through the pin holes 109 and are fitted in the holes 108, extend from the second slide member 92.

The first slide member 91 is moved in the axial direction by the first shift fork 95, and the second slide member 92 is moved in the axial direction by the second shift fork 99.

Two slide members 91, 92 are arranged in a juxtaposed manner, and the second pins 112 are made to pass through the first slide member 91 in a penetrating manner. Accordingly, the arrangement space necessary for arranging two slide members 91, 92 can be made small. That is, even when the differential mechanism restricting device 90 is mechanically connected to two operation elements, the differential mechanism restricting device 90 can be miniaturized.

Figure 11A:
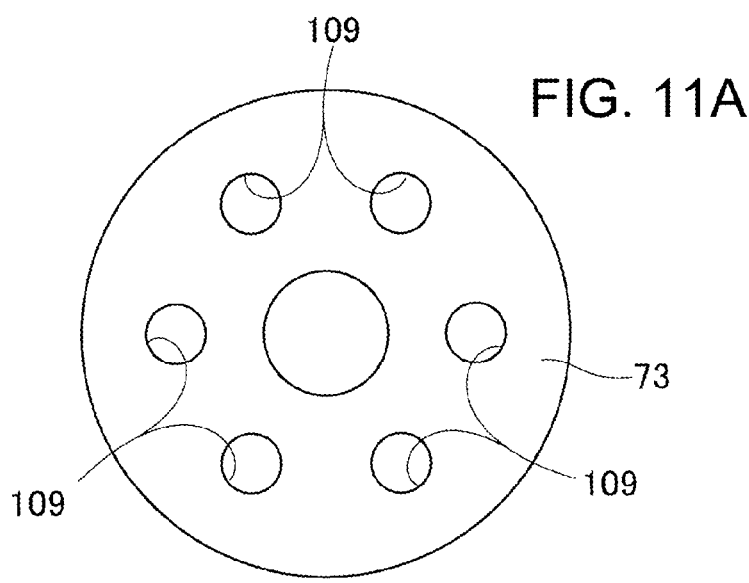
FIG. 11A is a view as seen from the direction indicated by arrow 11a-11a in FIG. 10.

As shown in FIG. 11A, a plurality of (six, in this embodiment) pin holes 109 are formed in the differential case 73 at an equal pitch, that is, equidistantly in the circumferential direction.

Figure 11B:
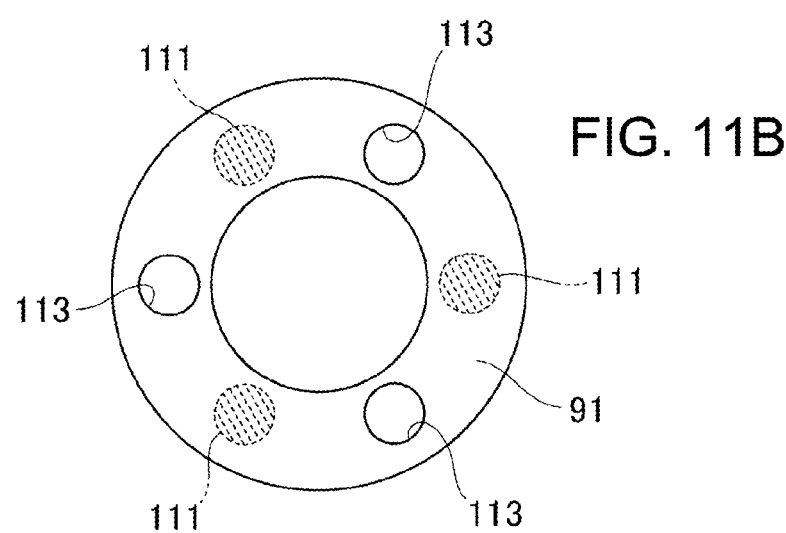
FIG. 11B is a view as seen from the direction indicated by arrow 11b-11b in FIG. 10.

As shown in FIG. 11B, the first slide member 91 is provided with three first pins 111 and three openings 113 such that each opening 113 is arranged between adjacent first pins 111, 111. The first slide member 91 is formed in an annular shape and hence, the first slide member 91 has a sufficiently large amount of rigidity although three openings 113 are formed in the first slide member 91. Accordingly, the first slide member 91 enables the differential lock with high rigidity.

Figure 11C:
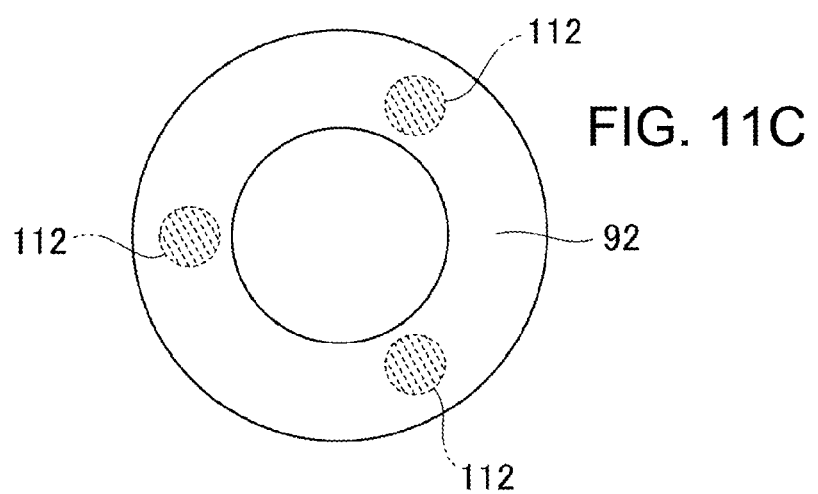
FIG. 11C is a view as seen from the direction indicated by arrow 11c-11c in FIG. 10.

As shown in FIG. 11C, three second pins 112 are mounted on the second slide member 92, and these second pins 112 are arranged at positions where the second pins 112 pass through the openings 113 formed in the first slide member 91 in a penetrating manner and pass through the pin holes 108 formed in the differential case 73.

The manner of operation of the first pins 111 is explained with reference to FIGS. 12A and 12B, and the manner of operation of the second pins 112 is explained with reference to FIGS. 13A and 13B.

Figure 12A:
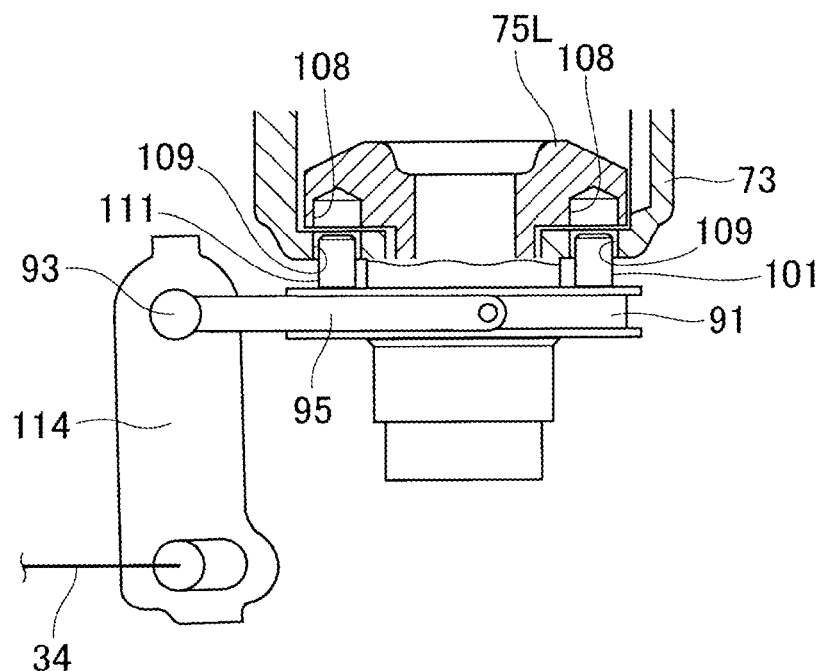
FIGS. 12a-12B show the manner of operation of a first slide member.

FIG. 12A shows the differential lock in an unlocked state. When the fourth wire 34 is loosened from such a state, the first arm 114 is loosened, and the first rotary shaft 93 is rotated in the counterclockwise direction in the drawing due to a biasing action of the torsion springs (indicated by symbol 96 and symbol 97 in FIG. 9). Then, the first shift fork 95 pushes the first slide member 91 toward a differential case 73 side.

Figure 12B:
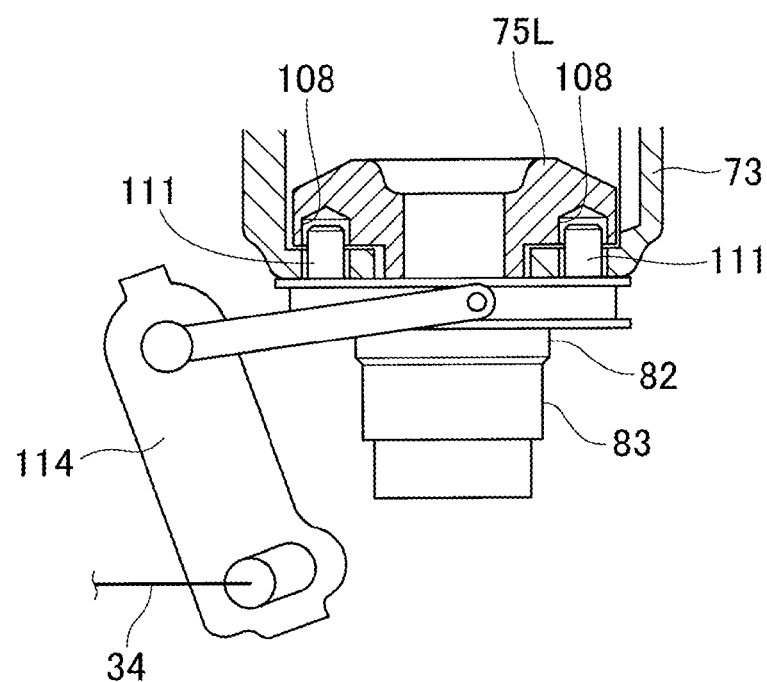

Due to such an operation, as shown in FIG. 12B, the first pins 111 are fitted in the holes 108 formed in the left output-side cam 75L. The first pins 111 are inserted into the pin holes 109 and the holes 108 in a state where the first pins 111 extend over the differential case 73 and the left output-side cam 75L and hence, the rotation of the left output-side cam 75L is prevented whereby a differential lock state is completed.

During an operation from the state shown in FIG. 12A to the state shown in FIG. 12B, the first shift fork 95 is advanced toward a differential lock side by being biased by either one of the torsion spring 96 and the torsion spring 97 shown in FIG. 9. In this case, the other of the torsion spring 96 and the torsion spring 97 performs an action of alleviating a frontwardly advancing speed of the first shift fork 95. That is, a so-called lost motion (slow movement) is performed and hence, the first thrust member 91 shown in FIG. 12A is gently brought into contact with the differential case 73.

Figure 13A:
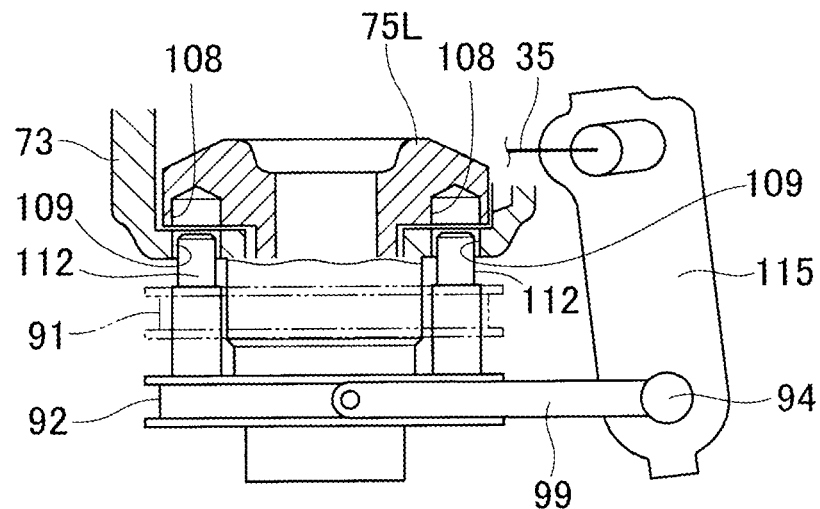
FIG. 13A-13B show the manner of operation of a second slide member.

FIG. 13A shows an unlocked state of the differential lock. When the fifth wire 35 is loosened from such a state, the second arm 115 is loosened, and the second rotary shaft 94 is rotated in the clockwise direction in the drawing due to a biasing action of the torsion springs (indicated by symbol 101 or symbol 102 in FIG. 9). Then, the second shift fork 99 pushes the second slide member 92 toward a differential case 73 side. The second pins 112 are made to pass through the first side member 91 in a penetrating manner as indicated by an imaginary line and hence, the second pins 112 are movable irrespective of the position of the first slide member 91.

Figure 13B:
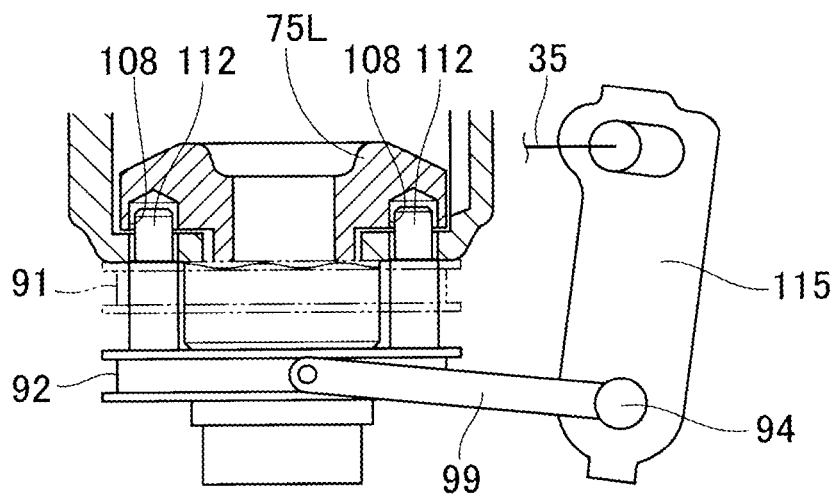

As a result, as shown in FIG. 13B, the second pins 112 are fitted in the holes 108 formed in the left output-side cam 75L. The second pins 112 are inserted into the pin holes 109 and the holes 108 in a state where the second pins 112 extend over the differential case 73 and the left output-side cam 75L and hence, the rotation of the left output-side cam 75L can be prevented whereby the rotation of the drive shaft (symbol 19L in FIG. 1), which is connected to the left output-side cam 75L, is prevented, thus completing a second parking brake state.

During an operation from the state shown in FIG. 13A to the state shown in FIG. 13B, the second shift fork 99 is advanced toward a differential lock side by being biased by either one of the torsion spring 101 and the torsion spring 102 shown in FIG. 9. In this case, the other of the torsion spring 101 and the torsion spring 102 performs an action of alleviating a frontwardly advancing speed of the second shift fork 96. That is, a so-called lost motion (slow movement) is performed and hence, the second thrust member 92 shown in FIG. 13(a) is gently brought into contact with the differential case 73.

Figure 14:
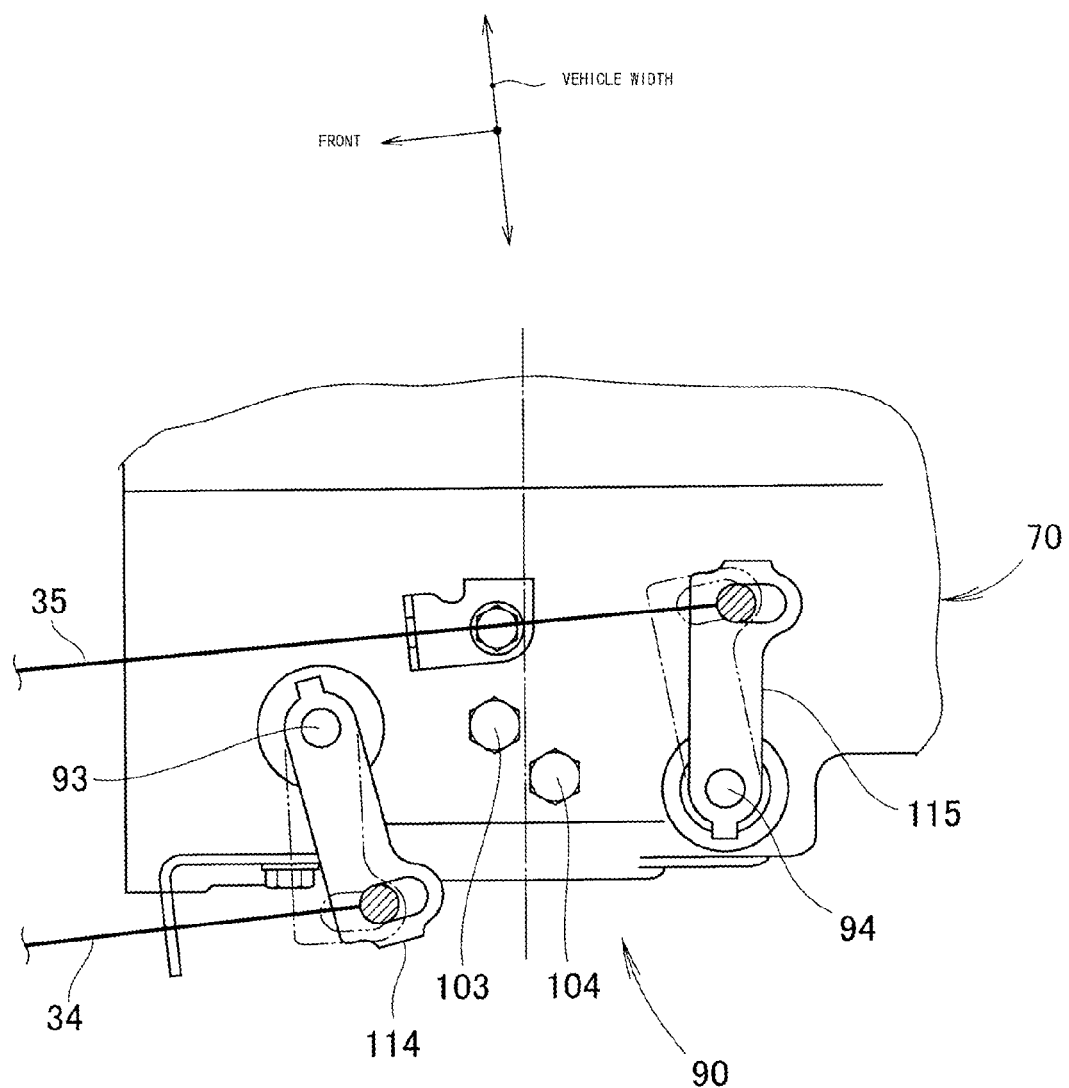
FIG. 14 is a plan view of the differential gear.

As shown in FIG. 14, the first rotary shaft 93 and the second rotary shaft 94 are arranged in an offset manner in the vehicle width direction, the first arm 114, which rotates the first rotary shaft 93, is mounted such that the first arm 114 extends toward a second rotary shaft 94 side in the vehicle width direction, and the second arm 115, which rotates the second rotary shaft 94, is mounted such that the second arm 115 extends toward a first rotary shaft 93 side in the vehicle width direction. Due to such a construction, the first arm 114 and the second lever 55 can be arranged in a compact manner.

Although the invention is preferably applicable to an off-road traveling vehicle, there is no problem in applying the invention to general vehicles.

In the embodiment, although the first and second pins are inserted into the holes in a state where these pins extend over the differential case and the output-side cam, the first and second pins may be inserted into the holes in a state where these pins extend over the ring gear and the output-side cam.

DESCRIPTION OF REFERENCE NUMERALS AND SIGNS

10: vehicle, 11: power unit, 12: transmission, 12A: drive force transmission interruption mechanism, 19L, 19R: drive shaft, 21L, 21R: drive wheel (rear drive wheel), 36: vehicle body frame, 37: shift lever panel, 38: L-shaped hole, 40: shift lever mechanism, 41: shift lever, 43: corner, 44: gate (parking gate), 45 to 48: gate, 58: first rotation axis, 59: second rotation axis, 74: differential mechanism, 90: differential lock mechanism (differential mechanism restricting device)

What is claimed is:

1. A vehicle comprising:
a transmission that is capable of changing a change gear ratio at which power is transmitted to rear left and right rear drive wheels from a power unit;
a propeller shaft that is connected to the transmission and transmits power to the rear left and right rear drive wheels;
a rear differential mechanism that generates a difference in rotational speed between the rear left and right drive wheels;
a differential lock mechanism that is configured to bring the rear differential mechanism into a non-differential state;
a shift lever that is supported on a vehicle body frame and changes a traveling mode of the vehicle and the change gear ratio of the transmission, the traveling mode of the vehicle is one of forward traveling mode, a neutral mode, and a backward traveling mode; and
a shift lever panel on which a plurality of gates into which the shift lever is inserted are formed;
a switch lever for changing a drive mode of the vehicle, the drive mode of the vehicle is one of a two-wheel drive mode and a four-wheel drive mode;
wherein the transmission includes a drive force transmission/interruption mechanism that restricts rotation of the propeller shaft,
the shift lever is mechanically connected to the transmission and is also mechanically connected to the differential lock mechanism, and
the vehicle includes a shift lever mechanism that is configured to perform a shift operation of the transmission and an operation of the drive force transmission/interruption mechanism by operating the shift lever and is configured to perform a lock operation and an unlock operation of the differential lock mechanism by operating the shift lever.

2. The vehicle according to claim 1, wherein the shift lever mechanism includes a first rotation axis about which the shift lever is rotated, and a second rotation axis that is arranged orthogonal to and close to the first rotation axis and about which the shift lever is rotated, and
the shift lever is rotated about the first rotation axis in operating the transmission, and is rotated about the second rotation axis in operating the differential lock mechanism.

3. The vehicle according to claim 2, wherein an L-shaped hole having a corner at a front end thereof is formed in the shift lever panel, and
the shift lever operates the transmission due to the operation thereof in a fore-and-aft direction, and operates the differential lock mechanism due to the operation thereof in a left-and-right direction.

4. The vehicle according to claim 3, wherein the L-shaped hole is formed to extend in a direction toward a side where a driver is seated from a corner at a front end thereof.

* * * * *